United States Patent [19]

Khasat et al.

[11] Patent Number: 5,480,940
[45] Date of Patent: Jan. 2, 1996

[54] POLYDICYCLOPENTADIENE HAVING IMPROVED STABILITY AND TOUGHENED WITH POLYMERIC PARTICLES

[75] Inventors: Nitya P. Khasat, Newark; Douglas Leach, Wilmington, both of Del.

[73] Assignee: Metton America, Inc., Abingdon, Va.

[21] Appl. No.: 400,445

[22] Filed: Mar. 7, 1995

Related U.S. Application Data

[63] Continuation of Ser. No. 273,544, Jul. 11, 1994, abandoned, which is a continuation of Ser. No. 997,370, Dec. 23, 1992, abandoned.

[51] Int. Cl.⁶ .............................. C08F 4/78; C08F 232/08; C08F 277/00
[52] U.S. Cl. .............................. 525/290; 525/75; 525/247; 525/289; 525/308; 525/315
[58] Field of Search .............................. 525/75, 290, 247, 525/289, 308, 315

[56] References Cited

U.S. PATENT DOCUMENTS

| | | |
|---|---|---|
| 4,400,340 | 8/1983 | Klosiewicz . |
| 4,418,178 | 11/1983 | DeWitt .................................. 525/290 |
| 4,436,858 | 3/1984 | Klosiewicz . |
| 4,458,037 | 7/1984 | Leach . |
| 4,469,669 | 9/1984 | Hibst . |
| 4,469,809 | 9/1984 | Klosiewicz . |
| 4,473,679 | 9/1984 | Falk et al. .............................. 525/902 |
| 4,481,344 | 11/1984 | Newburg . |
| 4,485,208 | 11/1984 | Klosiewicz . |
| 4,496,668 | 1/1985 | Newburg . |
| 4,496,669 | 1/1985 | Leach . |
| 4,507,453 | 3/1985 | Tom . |
| 4,520,181 | 5/1985 | Klosiewicz .............................. 525/290 |
| 4,535,097 | 8/1985 | Newburg . |
| 4,568,660 | 2/1986 | Klosiewicz . |
| 4,598,102 | 7/1986 | Leach . |
| 4,607,077 | 8/1986 | Silver et al. . |
| 4,657,981 | 4/1987 | Klosiewicz . |
| 4,689,380 | 8/1987 | Nahm . |
| 4,696,985 | 9/1987 | Martin . |
| 4,703,068 | 10/1987 | Nguyen . |
| 4,703,098 | 10/1987 | Matlack . |
| 4,708,969 | 11/1987 | Leach . |
| 4,710,408 | 12/1987 | Kraus . |
| 4,727,125 | 2/1988 | Nelson . |
| 4,731,395 | 3/1988 | Byrne et al. . |
| 4,740,537 | 4/1988 | Silver . |
| 4,751,337 | 6/1988 | Espy et al. . |
| 4,782,125 | 11/1988 | Newburg . |
| 4,783,506 | 11/1988 | Gawin . |
| 4,808,635 | 2/1989 | Nguyen . |
| 4,812,543 | 3/1989 | Matlack et al. . |
| 4,822,839 | 4/1989 | Paisner . |
| 4,826,942 | 5/1989 | Nelson . |
| 4,835,230 | 5/1989 | Khasat et al. . |
| 4,863,787 | 9/1989 | Gawin . |
| 4,882,401 | 11/1989 | Bell . |
| 4,883,849 | 11/1989 | Matlack . |
| 4,897,456 | 1/1990 | Nelson . |
| 4,900,799 | 2/1990 | Hara et al. . |
| 4,902,560 | 2/1990 | Silver . |
| 4,918,039 | 8/1990 | Martin . |
| 4,918,138 | 4/1990 | Hara et al. . |
| 4,918,146 | 4/1990 | Matlack . |
| 4,923,943 | 5/1990 | Hara et al. . |
| 4,933,402 | 6/1990 | Matlack . |
| 4,957,974 | 9/1990 | Ilenda et al. . |
| 4,977,215 | 12/1990 | Gardner et al. . |
| 4,977,218 | 12/1990 | Gardner et al. . |
| 4,981,931 | 1/1991 | Bell , |
| 4,997,884 | 3/1991 | Ilenda et al. . |
| 5,017,647 | 5/1991 | Dougal, Jr. et al. . |
| 5,019,544 | 5/1991 | Bell . |
| 5,047,474 | 9/1991 | Rabinovich et al. . |
| 5,053,256 | 10/1991 | Haag . |
| 5,082,909 | 1/1992 | Bell . |
| 5,094,806 | 3/1992 | Laughner . |
| 5,109,545 | 4/1992 | Schiller . |
| 5,202,380 | 4/1993 | Ilenda et al. .............................. 525/902 |

FOREIGN PATENT DOCUMENTS

| | | |
|---|---|---|
| 0305933 | 3/1989 | European Pat. Off. .............. 525/290 |
| 0392348 | 10/1990 | European Pat. Off. . |

OTHER PUBLICATIONS

English Abstract of Japanese Patent Application No. 87 012 609. (1987).
English Abstract of Japanese Patent Application No. 88 207 488. (1988).
Levita, G., et al., "Toughening of Epoxy Resins . . . ", Department of Chemical Engineering, Industrial Chemistry and Materials Science, pp. E4/1–E4/4. (undated).
Rohm and Haas Company product brochure, "Paraloid® EXL™ engineering resin additives, core/shell impact modifiers", 4 pages, (undated).
Rohm and Haas Company product brochure, "Paraloid® EXL™ 3387", 4 pages, (undated).
Rohm and Haas Company product brochure, "Paraloid® EXL™ 8887X Technical Data Sheet", 2 pp., (undated).
Rohm and Haas Company product brohcure, "Paraloid® EXL™ 3300 Technical Data Sheet", 2 pages, (undated).
Rohm and Haas Company product brochure, "Paraloid® EXL™ 3647 Technical Data Sheet", 2 pages, (undated).
Rohm and Haas Company product brochure, "Paraloid® EXL™ 4000 Technical Data Sheet", 2 pages, (undated).
Rohm and Haas Company product line description, Paraloid® EXL™ Engineering. Resin. Additives, 1 page, (undated).
Rohm and Haas Company product brohcure, "Impact Modifiers, a new generation of Plastics Additives for advanced Engineering Plastics", 9 pages, (undated).

Primary Examiner—Vasu S. Jagannathan
Attorney, Agent, or Firm—Fitzpatrick, Cella, Harper & Scinto

[57] ABSTRACT

Process for making a polymer and the resultant polymer wherein polymer particles, preferably those having a core and a shell structure, most preferably wherein the core comprises polybutadiene and the shell comprises polymethylmethacrylate, are included in metathesis polymerizable mixtures to provide the resultant polymer with improved resistance to oxidation and greater retention of mechanical properties upon thermal aging, and to toughen the resultant polymer.

20 Claims, No Drawings

POLYDICYCLOPENTADIENE HAVING IMPROVED STABILITY AND TOUGHENED WITH POLYMERIC PARTICLES

This application is a continuation of application Ser. No. 08/273,544 filed Ju. 11, 1995, now abandoned, which is a continuation of application Ser. No. 07/997,370 filed Dec. 23, 1992, now abandoned.

BACKGROUND OF THE INVENTION

1. Field of the Invention

The present invention relates to toughening ring-opened polymers and copolymers of dicyclopentadiene (poly DCPD) by the use of dispersed polymeric particles having a core and shell structure, and toughened polymers and copolymers of dicyclopentadiene comprising such polymeric particles.

The present invention also relates to imparting improved resistance to oxidation to ring-opened polymers and copolymers of dicyclopentadiene by the use of dispersed polymeric particles, preferably having a core and shell structure, and polymers and copolymers of dicyclopentadiene comprising such polymeric particles having improved resistance to oxidation.

The present invention also relates to imparting greater retention of mechanical properties upon thermal aging to ring-opened polymers and copolymers of dicyclopentadiene by the use of dispersed polymeric particles having a core and shell structure, and polymers and copolymers of dicyclopentadiene comprising such polymeric particles having greater retention of mechanical properties upon thermal aging.

The present invention relates to the production of improved metathesis polymerized polymer comprising such dispersed polymer particles, and the resultant improved metathesis polymerized polymer.

The metathesis polymerized polymer is made by ring-opening polymerization of metathesis polymerizable monomers, such as dicyclopentadiene and other strained ring polycyclic olefins. Specifically, the present invention relates to the use of a particle, preferably having a core and shell structure where the core comprises polybutadiene and the shell comprises crosslinked, polymethylmethacrylate to produce a crosslinked, thermoset dicyclopentadiene polymer having a high notched izod (NI) impact.

2. Discussion of Background Information

Polydicyclopentadiene (poly DCPD) prepared by ring-opening metathesis retains both of the double bonds present in the monomer. The double bonds are present either in the polymer backbone, in the crosslinks or branches between chains, or in unopened cyclopentene rings pendant to the polymer chains. These double bonds all provide sites for oxidation of the polymer chain. Antioxidants can be added which provide substantial increases in the stability of the polymer as measured by increases in retention of notched izod, Gardner, and plate impact strengths, and tensile elongation.

Polydicyclopentadiene can be toughened by the addition of an elastomer which is dissolved in the starting monomer, and subsequently phase separated during the polymerization to form a dispersed elastomer phase, for example, as disclosed in U.S. Pat. No. 4,400,340, Klosiewicz, and its related U.S. Pat. Nos. 4,436,858 4,469,809; 4,485,208; and 4,657,981. U.S. Pat. No. 4,400,340, Klosiewicz, also describes the preparation of high impact resistant thermoset polymer of dicyclopentadiene (DCPD) by ring-opening polymerization of dicyclopentadiene in the presence of a metathesis catalyst.

It is also known to toughen thermoset polymers by the addition of rubber particles, such as in U.S. Pat. Nos. 4,783,506, Gawin, 4,863,787, Gawin, 4,977,218, Gardner, and 4,977,215, Gardner.

In contrast to the rubber particles, or balls, which are generally formed in toughening other thermosets such as epoxies, or thermoplastics, such as polystyrene, the morphology of the rubber phase in polydicyclopentadiene appears as a very diffuse, strand-like semi-continuous phase in TEM photomicrographs.

U.S. Pat. Nos. 4,689,380, Nahm, and 4,703,098, Matlack, relate to copolymerizing dicyclopentadiene (DCPD) with other strained ring polycyclic cycloolefins such as other cyclopentadiene oligomers so as to increase the glass transition temperature of the resultant polymer.

U.S. Pat. No. 4,481,344, Newburg, uses a halogen-containing hydrocarbyl additive that contains at least one trihalogen-substituted carbon atom or at least one activated halogen atom is added to at least one of the reactant streams.

U.S. Pat. Nos. 4,957,974 and 4,997,884, Ilenda et al., disclose polyolefins with improved impact strength by the addition of core-shell polymers compatibilized with the polyolefin matrix by the addition of a polyolefin-acrylic graft copolymer.

U.S. Pat. No. 5,047,474, Rabinovich et al., disclose impact modifier compositions consisting of a mixture of acrylic core-shell polymer and MBS core-shell polymer.

U.S. Pat. No. 5,094,806, Laughner, discloses examples of elastomeric impact modifiers for fluorinated polyolefins.

European Patent Publication No. 0 392 348, BASF, relates to toughened, thermosetting structural materials achieved by incorporating particles having a size within the range of 2 to 35 μm of differently soluble thermoplastics into heat curable epoxy resin systems.

SUMMARY OF THE INVENTION

The present invention is based on the discovery that inclusion of dispersed polymeric particles, preferably those having a core and a shell structure, most preferably wherein the core comprises polybutadiene and the shell comprises polymethylmethacrylate, in a metathesis polymerization reaction mixture toughens the resultant polymer, and provides the resultant polymer with improved resistance to oxidation and greater retention of mechanical properties upon thermal aging.

Accordingly, the present invention is directed to polymerization processes, such as metathesis polymerization processes, which involve incorporating polymeric particles, preferably having a core and shell structure, into a supply of polymerizable monomers, such as metathesis polymerizable monomers, to form a mixture thereof, and subjecting the mixture to polymerization conditions, i.e., metathesis polymerization conditions, e.g., by injecting the reaction mixture into a mold where polymerization occurs, to form a resultant polymer.

In one embodiment of the present invention, the process for producing a polymer having enhanced oxidation stability involves incorporating an amount of polymeric particles into a supply of polymerizable monomers to form a mixture comprising polymerizable monomers and polymeric particles, and subjecting a mixture comprising polymerizable monomers and polymeric particles to conditions suitable for polymerization to form a resultant polymer resistant to oxidation, wherein the polymeric particles remain substantially intact as particles during polymerization and are dispersed as particles throughout the resultant polymer, and preferably wherein the polymeric particles have a core and shell structure, wherein at least the shell of said polymeric particles is substantially insoluble in the mixture.

In another embodiment of the present invention, the polymerization process is a metathesis polymerization process, that involves subjecting a mixture comprising metathesis polymerizable monomers and polymeric particles having core and shell structure to conditions suitable for polymerization to form a resultant polymer.

For purposes of the present invention, polymerizable monomers and polymerization conditions are suitable for ring-opening polymerization, and the polymerizable monomers are metathesis polymerizable monomers, preferably wherein the mixture of metathesis polymerizable monomers and polymeric particles comprises a metathesis catalyst and the conditions effect a metathesis polymerization of the metathesis polymerizable monomers.

In accordance with the present invention, a reaction mixture may be formulated which comprises premixed metathesis polymerizable monomers, an activator of the metathesis catalyst system, the catalyst or procatalyst of the metathesis catalyst system, and the polymeric particles. Alternatively, a reaction mixture of polymerizable monomer incorporating the polymeric particles may be formed from two or more separate supply streams, one of which includes an activator of the metathesis catalyst system and another of which includes the procatalyst of the metathesis catalyst system, and any of which may include the polymeric particles.

The present invention is also directed to a polymers, such as metathesis polymerized polymers, comprising polymerized units of metathesis polymerizable monomers, and polymeric particles, preferably having the previously described core and shell structure.

The present invention is also directed to metathesis polymerizable mixtures which include metathesis polymerizable monomers, and polymeric particles preferably having the previously described core and shell structure.

The present invention is also directed to a metathesis polymerizable mixture which includes metathesis polymerizable monomers, polymeric particles preferably having the previously described core and shell structure, and at least one component of the metathesis polymerization catalyst system selected from the group consisting of an activator component and a procatalyst component.

In accordance with the present invention, the core of the polymeric particles comprises material selected from the group consisting of polybutadiene, butadiene styrene copolymer, polyisoprene, and polyisobutylene and the like; and the shell comprises material selected from the group consisting of polymethylmethacrylate, polyethylmethacrylate, polymethylacrylate, polybutylacrylate, and polyethylacrylate and the like.

For purposes of the present invention, about 0.5 wt. % to about 15 wt. % by weight of the mixture of such polymeric particles, preferably from about 2 wt. % to about 10 wt. %, more preferably between about 4 wt. % to about 10 wt. %, and most preferably from about 5 wt. % to about 10 wt. % are incorporated in the polymer.

The resultant polymers produced in accordance with the present invention have a notched izod greater than about 1.5 ft-lbs/in notch, and more preferably greater than about 2.7 ft-lbs/in notch. In accordance with the present invention, polymers toughened with polymeric particles having a core-shell structure have a notched izod more preferably greater than 3.8 ft-lbs/in notch, with a notched izod of greater than about 6.6 ft-lbs/in notch being more preferred. The most preferred notched izod is about 7.8 ft-lbs/in notch.

DETAILED DESCRIPTION OF THE INVENTION

In accordance with the present invention, polymers, preferably those composed of units of metathesis polymerizable monomers, such as (poly)di-cyclopentadiene, are toughened by including polymeric particles which are dispersed therein. The toughened polymers have improved resistance to oxidation and greater retention of mechanical properties upon thermal aging than corresponding polymers toughened by other methods, including toughening by dissolving a soluble hydrocarbon elastomer in the monomer prior to polymerization.

Among the mechanical properties which are retained for a longer period of time upon aging are tensile elongated and Gardner impact strength, both of which are measures of the toughness of a material.

It is also possible to increase the stability, or resistance too oxidation, of the polymer by the addition of stabilizers such as antioxidants. Such stabilizers include various phenolic or amine antioxidants such as 2,6-di-tert-butyl-4-methylphenol (BHT), diphenylamine (DPA), or N,N'-diphenyl-p-phenylenediamine (DPPD).

The improvement obtained in accordance with the present invention is obtained whether or not such antioxidants are used, and if such antioxidants are used, is in addition to the improvement obtained therefrom.

While not washing to be bound by any particular theory, it is believed that when soluble elastomers, such as soluble hydrocarbon elastomers, are used to provide toughness to the resulting polymer of DCPD, the resulting rubber phase (which has a continuous, strandlike appearance or morphology when observed by electron microscopy) can act as a pathway for the ready diffusion of oxygen into the polymer. It has been discovered, however, that when particulate materials in accordance with the present invention are incorporated in the reaction mixture, the particulate shape of the additive is maintained during the polymerization, and the particles are dispersed throughout the polymer, and preferably uniformly dispersed throughout the polymer. As such, the particulate material does not provide a ready, continuous path for diffusion of oxygen through the sample; thus, oxygen must diffuse into the sample through the polymer itself, where it is believed to not be as soluble, in order for the oxidation reaction to proceed.

Included among the types of polymeric particles which are effective in the present invention are those particles having a core and shell structure wherein the core is comprised of a styrene-butadiene polymer and the shell is comprised of a methacrylate polymer of methacrylate-styrene copolymer. Specifically among the particles which are effective in the present invention are Paraloid EXL 3607 and Paraloid EXL 3647 manufactured by the Rohm and Haas Company.

Other types of polymeric particles which retain their particulate shape when added to a polymerization reaction mixture according to the present invention and which, therefore, do not provide a ready path for the diffusion of oxygen into the polymer would be expected to be effective as well. These polymeric particles include rubber particles which do not have a core-shell structure, such as Hycar 1422 manufactured by B. F. Goodrich Company.

Although for purposes of the present invention, the particles may have any shape that permits it to effect the advantageous results disclosed herein, such as bead-like spheres or oblate spheroids, it has been discovered that fibrous materials, such as fibers, chopped fibers, and filaments would not be suitable and are not intended to fall within the scope of the term particle as used herein to define the present invention. As used herein, the term particle includes spheres, plates, and the like.

It has been discovered that the polymeric particles suitable for purposes of the present invention for obtaining improved toughness and improved resistance to oxidation should have a core and a shell structure, but particles not having a core and shell structure provide improved resistance to oxidation, The core may comprise a material selected from the group consisting of polybutadiene, butadiene styrene copolymer, polyisoprene, and polyisobutylene, but is most preferably butadiene styrene copolymer. The shell may comprise a material, such as polymethylacrylates selected from the group consisting of polymethylmethacrylate, polyethylmethacrylate, polymethylacrylate, polybutylacrylate, and polyethylacrylate, but is most preferably polymethylmethacrylate.

The present invention relates to ring-opening polymerization, preferably metathesis polymerization, and resultant polymerized polymers; the monomers and comonomers which are used in accordance with the present invention are described generally as metathesis polymerizable monomers and comonomers. By this is meant that polymerization is effected by opening of a cycloolefin ring. Metathesis polymerization is, per se, well known, for example as described by U.S. Pat. No. 4,400,340 to Klosiewicz. The metathesis polymerization reaction is catalyzed by a transition metal catalyst, such as a tungsten or molybdenum compound, and activated by an alkyl metallo compound. The reaction, unless steps are taken to delay it, takes place almost instantaneously upon combining a monomer-activator mixture with a monomer-catalyst mixture.

The process of the present invention can be used in metathesis polymerization processes where the metathesis polymerizable monomers, which are strained, non-conjugated polycyclic olefins, such as those selected from the group consisting of dicyclopentadiene (DCPD), trimers of cyclopentadiene, higher order cyclopentadiene oligomers, norbornene, norbornadiene, alkylidene norbornenes, dimethanohexahydronaphthalene,dimethanoocyahydronaphthalene, alkyl substituted derivatives of such cycloolefins and mixtures thereof, may be polymerized alone or in combination with one or more other metathesis polymerizable monomers or comoners, such as those selected from the group consisting of norbornene-type comonomers, e.g., norbornene, methylnorbornene, vinylnorbornene, ethylidenenorbornene, tetracyclododecene (1,4,5,8 dimethano-1,2,4a,5,8,8a-octahydronaphthalene), methyltetracyclododecene, tetracyclododecadiene, and cyclopentadiene oligomers, such as cyclopentadiene trimer (CPT) and higher oligomers.

Suitable cyclic olefin monomers and comonomers for purposes of the present invention include those of the norbornene type which can be represented by the general structural formulae:

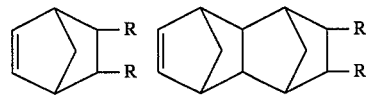

in which each R is selected independently from hydrogen, $C_{1-20}$ alkyl, $C_{1-20}$ alkenyl, aryl and, with R groups linked together through carbon atoms, saturated and unsaturated cyclic hydrocarbon groups. Examples of such monomers and comonomers suitable for purposes of the present invention are those selected from the group consisting of dicyclopentadiene, norbornene, norbornadiene, 5-(2-propenyl-)norbornene, methyltetracyclododecene, hexacycloheptadecene, 5-methyl-2-norbornene, 5-hexyl-2-norbornene, 5-dodecyl-2-norbornene, 5,6-dimethyl-2-norbornene, 5-butyl-2-norbornene, 5-octyl-2-norbornene, tricyclopentadiene (cyclopentadiene trimer), tetracyclopentadiene (cyclopentadiene tetramer), and dihydrodicyclopentadiene.

The previously identified metathesis polymerizable monomers can be used alone or in the form of a mixture of at least two or more of them. Dicyclopentadiene or a mixture of dicyclopentadiene with at least one other monomer is preferable. The preferred monomer, if used alone, is dicyclopentadiene.

Related to this, the supply of metathesis polymerizable monomers, polymerizable composition, or reaction mixture can contain one or more other strained ring polycyclic cycloolefin comonomers in amounts, for example, up to about 60% by weight. Exemplary strained ring polycyclic cycloolefins which can be employed as comonomers include those members selected from the group consisting of norbornene, vinylnorbornene, norbornene, ethylidene norbornene, phenylnorbornene, tetracyclododecadiene, and methyltetracyclododecadiene, and higher oligomers of cyclopentadiene, such as tricyclopentadiene and tetracyclopentadiene.

The most preferred monomer for preparing polymers according to the process of this invention is commercially available predominantly endo-dicyclopentadiene. The exo-isomer, while not commercially available, can also be used. The preferred commercially available monomer normally has a purity of at least 97% and preferably at least 99%. For the purposes of the following description DCPD will be used to illustrate the invention.

Reaction injection molding (RIM) is a preferred method of forming structures in accordance with the present invention. To this end, a polymerizable reaction mixture may be formed from one or more liquid streams. Where more than one stream is used one stream contains the activator of a metathesis catalyst system and/or reaction rate moderator, and a second or another stream contains the catalyst or procatalyst of the metathesis catalyst system. The terms catalyst and procatalyst are both used in reference to the metal compound, such as a tungsten halide, which forms the active metathesis catalyst when contacted with the catalyst activator. The monomer may be in any or all of these streams, i.e., in both of the two streams or in at least one separate stream. Preferably, the monomer is contained equal amounts in the procatalyst stream and the activator stream.

A preferred method in the practice of the present invention for the polymerization of metathesis polymerizable monomers, such as DCPD, is to contact a steam containing the procatalyst component, i.e., a tungsten compound, with a stream containing the activator component, wherein at least one of the streams contains the monomer. For example, it is possible to dissolve the tungsten procatalyst in DCPD and either to dissolve the activator in DCPD or in another solvent or to use the activator without any solvent. Usually both the tungsten procatalyst and the activator are first dissolved in separate streams of DCPD prior to the mixture of the streams.

Alternatively, more than two streams may be used where, for example, additives and/or monomers or comonomers are included in a third stream all of which are ultimately mixed to form the reaction mixture.

After the streams of procatalyst and activator have contacted with each other, the resulting reaction mixture may be poured or injected into a mold, where the polymerization takes place. The polymerization is exothermic, but heating the mold to from about 50° C. to 100° C., is preferred.

Alternatively, the reaction may also be carried out using a premixed polymerizable reaction mixture or composition comprising the activator, catalyst, metathesis polymerizable monomer(s), such as dicyclopentadiene, and other ingredients, provided that the composition is designed so that the induction time is sufficient to allow the mold to be filled completely prior to the onset of gelation and exothermic polymerization.

The metathesis polymerization reaction is an exothermic reaction and proceeds very rapidly. Under such situation, the polymerization often occurs before the mixture can be poured into a mold, and it makes the pouring of the mixture into the mold difficult and makes the production of large sized molded articles difficult. In such cases, it is preferred to add the procatalyst and the activator of the metathesis polymerization catalyst system to individual monomer solutions, referred to herein as Solution A and Solution B, to form separate supplies or mixtures of metathesis polymerizable monomers, each of which is a multi-part reactive solution, i.e., a multi-part metathesis polymerizable composition, which are ultimately formed into a reaction mixture by the combination thereof. In this method, the separate supplies of metathesis polymerizable monomers, or multi-part reactive solution,s, do not need to have the same composition of monomers in each part. The composition of the monomers of each solution may be changed freely taking final composition of the monomers into consideration. Solution A and Solution B, and then the multi-part reactive solutions are mixed rapidly to form the reaction mixture by means of impinging-mixing (the RIM process) or by using a static mixer or a dynamic rotary mixer, and finally the mixture is immediately poured into a mold wherein it is polymerized and molded.

Suitable catalyst components or procatalysts of the metathesis polymerization catalyst system include members selected from the group consisting of compounds, such as halides, of tungsten, molybdenum, rhenium, and tantalum, and preferably, compounds of tungsten or molybdenum. However, tungsten compounds, such as the $WOCl_{4-x}(OR)_x$ family of compounds wherein X is 0, 1, 2 or 3 and R is selected from the group consisting of alkyl derivatives, alkyl-substituted aryl derivatives, halogen-substituted derivatives, and silicon-containing analogues, are preferred. Preferred tungsten compounds are tungsten halides, tungsten oxyhalides, and the like, preferred examples of which are tungsten hexachloride and tungsten oxychloride. Such tungsten halide compounds undesirably often initiate premature cationic polymerization immediately when added directly to the mixture of the monomers, or they, or the catalyst, can be combined with other compounds that serve to moderate the rate of reaction. It is, therefore, preferable that they are previously suspended in an inert solvent such as, for example, benzene, toluene, or chlorobenzene. The solvent must not be susceptible to halogenation by the metal halide compound.

The tungsten compound can then be solubilized by the addition of an alcoholic compound or a phenolic compound. It is preferred, however, to use DCPD as a solvent for the procatalyst component. Preferably, the procatalyst component is dissolved in a monomer stream to form a reactive solution.

In order to provide a suitable induction time, an alkyl tin hydride or another activator system such as a dialkyl aluminum iodide, can be used as the catalyst activator as taught, e.g., in U.S. Pat. Nos. 4,598,102, 4,469,669, 4,458,037, 4,708,969, 4,981,931, 5,019,544, and 5,082,909 the disclosures of which are incorporated in their entireties by reference thereto herein. The activator components of the metathesis polymerization catalyst system suitable for purposes of the present invention include organic metal compounds, such as those selected from the group of alkylated products of metals of Group I–Group III in the periodic Table, for example, alkylaluminum compounds, such as those selected from the group consisting of diethylaluminum chloride, ethylaluminum dichloride, trioctylaluminum, and dioctylaluminum iodide, and alkyltin compounds, such as tetraalkyl tins, trialkyl tin hydrides such as tributyltin, tributyltin hydride, trioctyltin hydride, or trineophyltin hydride. The activator component may be dissolved in the other monomer stream to form the other reactive solution.

Thus, various activator compounds may be employed, as are known in the art, to act together with the tungsten procatalyst compounds or complexes described above to cause the polymerization of strained ring polycyclic cycloolefins. Mixtures of two or more activator compounds may produce more desirable polymerization conditions and more desirable polymer properties than a single activator compound in certain situations.

A particularly preferred activator is an alkylaluminum compound selected from the group consisting of a dialkylaluminum halide, trialkylaluminum, or a mixture thereof, where the alkyl group contains one to twelve carbon atoms. The dialkylaluminum halides preferred for use in the process of the invention are dialkylaluminum iodides having 1 to 12 carbon atoms in the alkyl groups, preferred species being diethylaluminum iodide and dioctylaluminum iodide. When used in conjunction with another alkylaluminum compound, the other compound can be either a trialkylaluminum or a dialkyl aluminum chloride having alkyl groups of 1 to 12 carbon atoms. A particularly preferred activator is an alkylaluminum compound selected from the group consisting of a trialkylaluminum, dialkylaluminum halide, or a mixture thereof, where the alkyl group contains one to ten carbon atoms. Preferred are compounds wherein the alkyl groups have 2 or 8 carbons. A mixture of trioctylaluminum and dioctylaluminum iodide, i.e., a mixture of tri-n-octylaluminum and di-n-octylaluminum iodide is a preferred activator mixture for catalysts based on tungsten or molybdenum halides. Similarly, for the $WOCl_{4-x}(OR)_x$ family of catalysts or procatalysts, the preferred activator comprises alkyl tin hydride compounds.

With the foregoing in mind, activator compounds that can be employed in the practice of the present invention, in addition to alkylaluminum compounds selected from the group consisting of dialkylaluminum halides, trialkylaluminum compounds selected from the group consisting of alkylaluminum dihalides, dialkyl(alkoxy)aluminum, and alkyl(alkoxy)aluminum halides, and mixtures thereof; alkylmagnesium compounds selected from the group consisting of alkylmagnesium chlorides (Grignard reagents: RMgCl), and dialkylmagnesiums ($R_2Mg$); alkylzincs selected from the group consisting of dialkylzincs, and alkylzinc halide; arylzincs, such as diarylzinc, and arylzinc halide; alkylsilanes selected from the group consisting of $RSiH_3$, $R_2SiH_2$, and $R_3SiH$; and alkyltin compounds, such as trialkyltin hydrides and dialkyltin dihydrides, in addition to aryltin compounds, such as triaryltin hydrides, and the corresponding alkyl and aryl lead hydrides. In preferred trialkyltin hydrides, the alkyl group contains from one to ten carbon atoms. Among the trialkyltin and triaryltin hydrides suitable for use in the process of the invention, tri-n-butyltin hydride, trioctyltin hydride, and triphenyltin hydride are preferred, with tri-n-butyltin hydride being most preferred. More specific examples of activators which are useful for purposes of the present invention include members selected from the group consisting of triethylaluminum, ethylmagnesium chloride, diethylmagnesium, diethylzinc, dibutylzinc, ethyl-n-propoxyaluminum chloride, diphenylzinc, and diphentyltin dihydride.

When the two parts of the catalyst system, i.e., the procatalyst and the activator, e.g., a tungsten procatalyst and a tin activator, are combined the resulting cycloolefin, for example, DCPD, to catalyst compound ratio will be from about 500:1 to 15,000:1 on a molar basis, preferably 2,000:1, activator ratio will be from about 1:1 to 1:8.

When a tungsten compound is used as the catalyst or procatalyst component, the ratio of the tungsten compound to the above-mentioned monomers is about 1:1,000—about 1:15,000, and preferably about 1:2,000 and molar basis. When an alkylaluminum compound is used as the activator component, the ratio of the aluminum compound to the above-mentioned monomers is about 1:100—about 1:2,000 and preferably about a ratio of about 1:400—about 1:700 on molar basis.

One part of the catalyst system comprises the metathesis previously identified tungsten compounds, is preferably put in solution with DCPD monomer. The tungsten compound can be solubilized in DCPD by the addition of a small amount of an alcoholic or a phenolic compound. Phenolic compounds are preferred. Suitable phenolic compounds include phenol, ortho-meta or para-alkyl phenols, and halogenated phenols with tert-butylphenol, tert-octylphenol, nonylphenol, 2,6-di-iso-propylphenol and 2,6-dichloro-4-octylphenol being preferred. Nonylphenol, 2,6-di-iso-propylphenol, and 2,6-dichloro-4-octylphenol are most preferred. The preferred molar ratio of tungsten compound/ phenolic compound is from about 1:1; to about 1:3. The tungsten compound/phenolic compound solution can be made by adding the phenolic compound to a tungsten compound/organic solvent slurry stirring the solution and then blowing a stream of a dry inert gas through the solution to remove the hydrogen chloride that is formed. Suitable organic solvents include hydrocarbon solvents, such as pentane and hexane, aromatic solvents, such as benzene, toluene and xylene, and chlorinated solvents, such as chlorobenzene. An example of a preferred solvent is pentane. Alternatively, a phenolic salt, such as a lithium or sodium phenoxide, can be added to a tungsten compound/organic solvent slurry, the mixture stirred until essentially all of the tungsten compound is dissolved, and the precipitated inorganic salt removed by filtration or centrifugation. All of these steps should be carried out in the absence of moisture and air to prevent deactivation of the catalyst.

To prevent premature polymerization of the tungsten compound-monomer solution, which would occur within a matter of hours, from about 1 to about 5 moles of a Lewis base can be added per mole of tungsten compound. Chelating agents may also be included for the purpose of enhancing shelf life. Preferred Lewis bases are nitriles and ethers, such as benzonitrile, tetrahydrofuran, n-butyl ether and diethylene glycol dimethyl ether. Preferred chelants include acetylacetones and alkyl acetoacetates, where the alkyl group contains from one to ten carbon atoms.

The improvement in the stability and shelf life of the tungsten compound-monomer solution is obtained whether the chelating agent or Lewis base is added before or after the phenolic compound. When DCPD is added to this catalyst solution, it forms a solution that is table and has a shelf life of several months. After the catalyst solution has been dissolved in monomer to make a stable solution, the solvent can be removed under vacuum to make a catalyst-monomer solution that is substantially free of solvent. Alternatively, the solution of catalyst in solvent can be dried to afford the solid catalyst, which may be dissolved in a mixture of monomer and Lewis base. Additional descriptions of catalyst preparations can be found in, e.g., U.S. Pat. Nos. 4,568,660, Klosiewicz; 4,826,942Bell; and 5,019,544Bell, the disclosures of which are hereby incorporated in their entireties by reference thereto herein.

The other part of the metathesis catalyst system, which comprises a previously described activator, is also preferably put in solution with DCPD monomer. This mixture is storage stable, and, therefore, unlike the tungsten compound-monomer solution, needs no additives to prolong its shelf life. If however, an unmodified activator-monomer solution is mixed with the catalyst-monomer solution, the polymerization would initiate instantaneously and the polymer could set up in the mixing head. In the metathesis polymerization process of the present invention, a rate moderator compound may be used to delay the onset of polymerization and provide sufficient time for adequate mixing of the catalyst components, and allow the mold to be completely filled. The rate moderator can also be added to the tungsten or activator components.

Reaction rate moderators which are suitable for this purpose include Lewis bases, examples of which include members selected from the group consisting of nitriles, and ethers. Preferred ethers include n-butyl ether, and diethylene glycol dimethyl ether, also referred to herein as diglyme. Reaction rate moderators which are suitable for use with triakyltin hydride activators include phosphines and phosphites, such as tributylphosphine and trinutylphosphite. Ethers, esters, ketones and nitriles are preferred moderators for other alkylaluminum compounds. Ethyl benzoate and butyl ether are preferred. Particularly preferred for aluminum alkyl activators is the dimethyl ether of diethylene glycol. If longer delay or slower initiation of reaction is desirable, a sterically unhindered or partially unhindered nucleophilic Lewis base such as pyridine, quinoline or quinoxaline can be used as the moderator.

For longer induction times in U.S. Pat. No. 4,727,125, Nelson, the disclosure of which in its entirety is hereby incorporated by reference, teaches the use of sterically unhindered or partially unhindered nucleophilic Lewis bases including unsaturated cyclic amines such as those selected from the group consisting of pyridine, 2-,3-,4-substituted pyridines, or 3,4-di-substituted pyrazines, 2-2,2,3-di-substituted pyridines, or 2,5-di-substituted pyrazines, quinoline and quinoxaline, and cyclic saturated polycyclic amines such as hexamethylene tetramine and 1,4-diazabicyclo [2.2.2]octane, as well as phenanthridine, pyrimidine, isoquinoline, and substituted derivatives of these materials, and, in U.S. Pat. No. 4,826,942, commonly assigned herewith and the disclosure of which is also incorporated by reference, the use of 1,3-bidentate Lewis bases.

For the $WOCl_{4-x}(OR)_x$ family of compounds, the inclusion of the rate moderator is most often desired when employing alkyl tin hydride activators. The rate moderator compounds include various nitrogen or phosphorus compounds used for this purpose as described in U.S. Pat. Nos. 4,727,125; 4,883,849; and 4,933,402, the disclosures of which are hereby incorporated by reference in their entireties. Preferred rate moderators include pyridine (py); pyrazine (pyz); tributylphosphite $((BuO)_3P)$; tributylphosphine $(Bu_3P)$; triisopropylphosphite.

A preferred method in the practice of the present invention for the polymerization of DCPD is to contact a tungsten compound, i.e., the "procatalyst component," with a trialkyltin hydride compound, i.e., the "activator component" stream, wherein at least one of the streams contains the monomer. For example, it is possible to dissolve the tungsten procatalyst in DCPD and either to dissolve the activator in DCPD or in another solvent or to use the activator without any solvent. Usually both the tungsten procatalyst and the tin activator are first dissolved in separate streams of DCPD prior to the mixture of the streams.

The preferred ratio of the alkylaluminum activator to moderator is from about 1:1 to about 1:5 on a molar basis. Suitable moderators for trialkyltin hydride activators include trialkylphosphites or trialkylphosphines, where the alkyl group is from one to ten carbon atoms. An example of a preferred phosphite is tributylphosphite. An example of a preferred phosphine is tributylphosphine. Particularly preferred is tributylphosphite.

The tungsten procatalyst may be stored in DCPD from some time provided that the DCPD contains only a few ppm of water or less. The tin activator compounds, e.g., trialkyltin hydride, are storable in DCPD for prolonged periods and tolerate relatively higher levels of water than the procatalysts without losing their reactivity. Stabilizers are generally only necessary when the monomer and tungsten procatalyst are to be stored together for prolonged periods of time with the monomer and activator combination stored separately.

In order to maintain the stability of tungsten compounds in high purity DCPD, prevent premature polymerization of the tungsten compound-monomer solution, and aid in the solubility of the procatalyst compounds it has been shown that the addition of a Lewis base or chelating agent to serve as a stabilizing or solubilizing compound to the solutions may be necessary. The addition of a stabilizer is not an absolute requirement of the practice of the invention. Preferred Lewis bases or stabilizers include diethyl ether, ethylene glycol dimethyl ether (glyme or monoglyme), bis(methoxy)ethylether (diglyme), triglyme, tetraglyme, benzonitrile, acetonitrile, tetrahydrofuran, and bulky monophenols (such as 2,6-di-tert-butyl-4-methylphenol, e.g., BHT, 2,6-di-tert-butyl-4-sec-butylphenol, e.g., Isonox 132), bisphenols (such as 2,2'-methylenebis( 4-methyl-6-butylphenol), e.g., Lowinox 22M46; 2,2'-methylenebis(4-ethyl-6-butylphenol), e.g., Cyanox 425; 4,4'-methylenebis(2,6-di-tert-butylphenol), e.g., Lowinox 002; 2,2'-ethylenebis(4,6-di-tert-butylphenol), e.g., Vanox 1290; 2,2'-methylenebis(4-ethyl-6-(1-methylcyclohexyl)phenol), e.g., Permanax WSP; 4,4'-butylidenebis(6-tert-butyl-3-methylphenol), e.g., Lowinox 44B25; 4,4'-thiobis(6-tert-butyl-3-methylphenol), e.g., Lowinox 44S36; 4,4'-methylenebis(2, 6-dimethylphenol), e.g., Lowinox 44M26; 1,1'-thiobis(2-naphthol), e.g., SAO-30; 2,2'-thiobis(4-methyl-6-tert-butylphenol), e.g., SAO-6; 2,2'-isobutylidenebis(4,6-dimethylphenol), e.g., Lowinox 22IB46; 2,2'-methylenebis(4-methyl-6-cyclohexyl)phenol), e.g., Vulkanox ZKF; polyphenols (such as 1,3,5-trimethyl-2,4,6-tris(3,5-di-tert-butyl-4-hydroxybenzyl)benzene, e.g., Ethyl Antioxidant 330; sterically hindered polynuclear phenol, e.g., Lowinox 22CP46; sterically hindered polynuclear phenol, e.g., Lowinox CPL; butylated reaction product of p-cresol and dicyclcopentadiene, e.g., Wingstay L powder). Preferred chelants include acetylacetones and alkyl acetoacetates, where the alkyl group contains from one to ten carbon atoms. In addition, mixtures of the above stabilizer compounds, such as mixture of diglyme and one or more phenols or Lewis bases, can be employed in the practice of the present invention.

Since poly(DCPD) contains some unsaturation, it may be subject to oxidation. The product can be protected from oxidation by the incorporation of a phenolic or amine antioxidant at a level of up to about 4.0 wt. %. Preferred antioxidants include 2,6-tert-butyl-p-cresol, N,N'-diphenyl-p-phenylenediamine and tetrabis[methylene(3,5-di-t-butyl-4-hydroxycinnamate)]-methane. While the antioxidant can be added to any or all of the streams, incorporation into the catalyst monomer stream is preferred in two stream systems wherein an activator, such as an aluminum alkyl activator, is included in one of the streams. In the case where the antioxidant would tend to react with the activator, the antioxidant should be included in a stream which does not contain the activator.

Various other additives can be included to modify the properties of poly(DCPD). Possible additives include solvents, blowing agents, encapsulated blowing agents, pigments, antioxidants, light stabilizers, flame retardants, plasticizers, foaming agents, fillers, reinforcing agents, macromolecular modifiers, and polymeric modifiers can be added to obtain desired properties. Suitable fillers include glass, wollastonite, mica, carbon black, talc, and calcium carbonate. A characteristic of fillers suitable for purposes of the present invention is that the filler remain in a separate phase. Because of the rapid polymerization time, the additives are preferably incorporated before the DCPD is charged to the mold. It is often desirable that the additives be combined with one or both of the streams of the catalyst system before being injected into the mold. Fillers can also be charged to the mold cavity, prior to charging the reaction streams, if the fillers are such that the reaction stream can readily flow around them to fill the remaining void space in the mold. The additives may be added in either any or all of multi-part reactive solutions. The additives must be ones being substantially unreactive with the highly reactive catalyst and activator component of the metathesis polymerization catalyst system in the solutions to inhibit polymerization.

If a reaction between the additive and the catalyst system is unavoidable but does not proceed so rapidly, the additives can be mixed with the monomers to prepare a third solution or stream,and the third solution or stream is mixed with the first and/or second solutions or streams of the multi-part solutions immediately before pouring the mixture into a mold. When the additive is a solid, a reactive solution containing the solid suspended in it can be used. It is essential that the additives not affect catalytic activity.

One class of possible additives is reinforcing agents or fillers that can increase the polymer's flexural modulus with only a small sacrifice in impact resistance. Possible fillers include glass, wollastonite, mica, carbon black, talc, and calcium carbonate. It has been discovered that in spite of the highly polar nature of their surfaces, these fillers can be added without appreciably affecting the polymerization rate. From about 5% to 75% by weight may be incorporated, based on the weight of the final product. The addition of fillers that have modified surface properties is particularly advantageous. The exact amount is easily determinable by one skilled in the art and depends on the preferences of the practitioner. The addition of fillers also serves to decrease the mold shrinkage of the product.

A compound may also be added which reduces the amount of the unreacted residual monomers in the molded article to avoid the unpleasant odor originated from the unreacted monomers. Examples of such compounds include α-trichlorotoluene, dichlorodiphenyl methane, esters of trichloro acetic acid, and the like.

In a preferred synthesis, poly(DCPD) is made and molded with the reaction injection molding (RIM) process. The two parts of the metathesis catalyst system, i.e., the procatalyst and the cocatalyst or activator are each mixed with DCPD to form solutions that are placed in separate vessels. These vessels or containers provide the source or supply of the metathesis polymerizable monomers for separate streams. The two streams are combined in the RIM machine's mixing head and then injected into a warm mold where they quickly polymerize into a solid, infusible mass. However, the present invention is not restricted to use in systems employing two streams each containing monomer.

After the streams of the metathesis polymerizable monomers including the procatalyst and the activator have contacted with each other, the resulting mixture may be poured or injected into a mold, where the polymerization takes place. The polymerization is exothermic, but heating the mold from about 50° C. to 100° C., is preferred.

As described above, the molded polymer articles produced by metathesis polymerization in accordance with the present invention are preferably prepared by simultaneous molding with polymerizing, i.e., by a RIM process or a pre-mix process. In the RIM process, either or both of the streams which contain the metathesis polymerizable monomer may be formulated to include the polymeric particles in accordance with the present invention. The monomer streams are rapidly mixed in the impingement mixing head of a RIM machine and the mixture is poured into a mold wherein it polymerizes and is molded into a polymer which includes the polymeric particles which are dispersed therein in accordance with the present invention.

In pre-mix processes, two-part monomer solutions containing the catalyst component and the activator component, respectively, either or both of which may be formulated to also include the polymeric particles in accordance with the present invention, are mixed to prepare a pre-mixture and then the pre-mixture, including the polymeric particles, is introduced into a mold where it polymerizes and is molded into a polymer which includes the polymeric particles which are dispersed therein in accordance with the present invention.

In the RIM and premix processes, reinforcing fibers, such as glass fibers, may be placed in the mold prior to pouring the mixed reactive solutions, i.e., reaction mixture, or particulate fillers may be added in at least one of the reactive solutions or premixtures, the latter being preferred.

In both the RIM process and the pre-mix process, the reaction mixture can be introduced into the mold under a relatively low pressure so that an inexpensive mold is unable. The temperature inside the mold increases rapidly by heat of the polymerization reaction so that the polymerization reaction is completed in a short time. The molded article of the invention can be removed easily from the mold without a releasing agent, unlike the polyurethane-RIM process.

As previously discussed, the structure of the polymer particles suitable for purposes of the present invention has been found to be critical in toughening the resultant polymer in accordance with the present invention. In this regard, the polymeric particles must have a core and a shell structure. The composition of the core is preferably an elastomer which preferably includes material selected from the group consisting of polybutadiene, butadiene styrene copolymer, polyisoprene, and polyisobutylene and mixtures of at least two materials directed from the group of polybutadiene, butadiene styrene copolymer, polyisoprene, and polyisobutylene. The most preferred material for the core is butadiene styrene copolymer. The composition of the shell of the polymer particles which is preferred includes a material selected from the group consisting of polymethylmethacrylate, polyethylmethacrylate, polymethylacrylate, polybutylacrylate, and polyethylacrylate and mixtures of at least two materials selected from the group of polymethylmethacrylate, polyethylmethacrylate, polymethylacrylate, polybutylacrylate, and polyethylacrylate. The most preferred material for the shell is polymethylmethacrylate.

Polymeric particles which have the previously described structure and composition that have been discovered to be suitable for purposes of the present invention include commercially available products selected from the group consisting of Paraloid EXL 2691, Paraloid EXL 3607, and Paraloid EXL 3647 manufactured by the Rohm and Haas Company. Most preferred for purposes of the present invention are polymeric particles Paraloid EXL-3607 manufactured by the Rohm & Haas Company. However, rubber particles which do not have a core-shell structure which are used as impact strength modifiers for other plastics include Hycar 1422 manufactured by the B. F. Goodrich Company, and Paraloid EXL 2386 and Paraloid EXL 3330 manufactured by the Rohm and Haas Company have not been found to be suitable for improving toughness in accordance with the present invention, however, as discussed above, these particles provide improved resistance to oxidation.

For purposes of the present invention, a preferred formulation of the components of the monomer streams and properties of the resultant polymer are tabulated below:

| Formulation | | |
|---|---|---|
| Component 'A' | Component 'B' | |
| 600 ml | 600 ml | Dicyclopentadiene |
| 12 ml | 12 ml | Ethylidenenorbornene |
| 24 g | 24 g | Paraloid 2691 |
| 14.4 ml | — | 1.0M Activator |
| — | 9.5 ml | 0.5M Catalyst |
| — | 24 g | Irganox - 1035 |
| Properties | | |
| Notched Izod = | 7.8 ft-lbs/in notch | |
| Heat Deflection = | 91° C. | |

-continued

Temp. @ 264 psi

The notched izod (NI) impact properties suitable for purposes of the present invention obtained with these particles is a notched izod (ft-lobs/in notch) of greater than about 2.7 ft-lbs/in notch and is preferably with the range of 2.7 ft-lbs/in notch to about 9.7 ft-lbs/in notch. A notched izod impact strength of greater than about 3.8 ft-lbs/in notch is more preferred, with notched izod impact strengths of greater than about 6.6 being even more preferred. Polymers produced in accordance with the present invention which exhibit a notched izod impact strength of greater than about 7.8 ft-lbs/in notch, e.g., 9.8 ft-lbs/in notch, are more preferred.

Although not wishing to be bound by any particular theory, it is believed that the toughening of the metathesis polymerized polymer by these polymeric particles may also be attributed in part to their small size, preferably within the range of about 1 μm to about 100 μm, and more preferably less than about 5 μm, in addition to their core-shell structure.

The following non-limiting examples are presented to illustrate the present invention.

EXAMPLES

Example 1

Tungsten hexachloride (32.83 g; 0.083 mold) was weighed into a 10 oz. bottle (soda pop bottle), which was then capped and inerted with nitrogen. Dry toluene (90 Ml) was then added by syringe. A solution of 2.0 Ml of tert-butyl alcohol in 5 Ml of toluene was added over a 5-minute period. The solution was then stirred while being bubbled with a slow stream of nitrogen for 1 hour. A solution of nonylphenol (22.5 g; 0.102 mole) in 10 Ml of dry toluene was added to the reaction mixture over a period of one hour. The solution was stirred for an additional two hours while being bubbled with a slow stream of nitrogen. A sample of 2,4-pentanedione (17 Ml; 0.166 mole) was then added by syringe over a period of 10 minutes. The solution was again stirred for two hours while being bubbled with a slow stream of nitrogen. Additional toluene (19 Ml) was added to the bottle to bring the final catalyst concentration to 0.5M.

Example 2

To a quantity of $WOCl_4$ (5.00 g; 0.0146 mole), stirring in cyclopentane under an atmosphere of nitrogen, was added a solution of 2,6-dichloro-4-tert-octylphenol ($HOC_6H_2$-2,6-$Cl_2$-4-$CMe_2CH_2CMe_3$) (8.06 g; 0.0293 mole) in cyclopentane (20 Ml). The phenolic solution was added dropwise over a period of 30 minutes. During the phenol addition, the reaction solution changed from orange to deep red. After phenol addition, the reaction mixture was allowed to stir at room temperature for two hours. Once the evolution of HCl had essentially ceased, the reaction mixture was refluxed for one hour. After allowing the reaction vessel to cool, the cyclopentane was evaporated under reduced pressure in a dry box. Dried catalyst 8.19 g; 0.0100 mole) was dissolved in a mixture of diglyme (2.86 Ml; 0.020 mole) and dicyclopentandiene (52.3 Ml) to make a 0.181M solution.

Example 3

Samples of A and B components were prepared for molding on a laboratory scale RIM machine as follows. To prepare an activator-monomer solution, or A component, Paraloid EXL 2691 (24 g) in a 1 L bottle (soda pop bottle) that had been previously inerted with nitrogen was suspended by mechanical stirring in a mixture of 588 Ml of dicyclopentadiene and 12 Ml of ethylidene norbornene. To this was added 14.4 Ml of a solution of 0.085 moles of tri-n-octylaluminum, 0.015 moles of di-n-octylaluminum iodide and 0.100 moles of diglyme in 100 Ml of dicyclopentadiene. To prepare a catalyst-monomer solution, or B component, Paraloid EXL 2691 (24 g) in a 1 L bottle (soda pop bottle) that had been previously inerted with nitrogen was suspended by mechanical stirring in a mixture of 588 Ml of dicyclopentadiene, 12 Ml of ethylidene norbornene and 24 g of Irganox 1035. To this was added 9.5 Ml of the catalyst solution prepared in Example 1.

The liquids were transferred to their respective tanks on a laboratory scale RIM machine under positive nitrogen pressure through stainless steel transfer lines. The mixing of the A stream and the B stream was accomplished using a standard impingement type RIM mixhead, and then into a steel mold 8"×8"×⅛" thick that was heated to 70° C. The ratio of the activator-monomer solution mixed with the catalyst-monomer solution was 1:1. The mixing time and mold filling were accomplished within two seconds, after which time an exotherm occurred within another 30 seconds. After two minutes, the plaque was removed from the mold.

Example 4

The procedure of Example 3 was followed except that 10 wt. % of Paraloid EXL 2691 was used, 18.0 grams of ethylidene norbornene were added. 25.1 Ml of the catalyst of Example 2 was used in the catalyst-monomer solution, 3.66 Ml of tri-n-butyltin hydride and 2.46 Ml of tributylphosphite were used in the activator-monmer solution.

Example 5

The procedure of Example 4 was used except that 2 wt. % of Paraloid EXL 3607 was used in both the activator-monomer solution and the catalyst-monomer solution.

Example 6

The procedure of Example 5 was used except that 5 wt. % of Paraloid EXL 3607 was used in both the activator-monomer solution and the catalyst-monomer solution.

Example 7

The procedure of Example 5 was used except that 10 wt. % of Paraloid EXL 3607 was used in both the activator-monomer solution and the catalyst-monomer solution.

Example 8

The procedure of Example 5 was used except that 5 wt. % of Paraloid EXL 3647 was used in both the activator-monomer solution and the catalyst monomer solution.

Example 9

The procedure of Example 6 was used except that 30 wt. % of the dicyclopentadiene monomer was replaced by tricyclopentadiene monomer, and no ethylidene norbornene was used.

Example 10

The procedure of Example 6 was used except that 50 wt. % of the dicyclopentadiene monomer was replaced by tetracyclododecene monomer, and no ethylidene norbornene was used.

Example 11

The procedure of Example 5 was used except that 2 wt. % Hycar 1422 was used as the polymeric modifier.

Example 12

The procedure of Example 5 was used except that 5 wt. % Paraloid EXL 2386 was used as the polymeric particle modifier.

Example 13

The procedure of Example 5 was used except that 8 wt. % Paraloid EXL 2386 was used as the polymeric particle modifier.

The notched izod impact properties (Notched Izod (ft-lbs/in notch) of polymers produced in Examples 3–13 are tabulated below:

TABLE

| Example | Rubber Particle | Notched Izod (ft-lbs/in notch) |
|---|---|---|
| 3 | 4 wt. % EXL 2691 | 7.8 |
| 4 | 10 wt. % EXL 2691 | 9.7 |
| 5 | 2 wt. % EXL 3607 | 7.1 |
| 6 | 5 wt. % EXL 3607 | 6.6 |
| 7 | 10 wt. % EXL 3607 | 8.2 |
| 8 | 5 wt. % EXL 3647 | 7.3 |
| 9 | 5 wt. % EXL 3607 | 2.7 |
| 10 | 5 wt. % EXL 3607 | 3.8 |
| 11 | 2 wt. % Hycar 1422 | 2.7 |
| 12 | 5 wt. % EXL 2386 | 2.06 |
| 13 | 8 wt. % EXL 2386 | 1.95 |

In addition to the previously described advantages of the present invention, among the mechanical properties which are retained for a longer period of time upon aging are tensile elongation and Gardner impact strength, both of which are measures of the toughness of a material.

It is also possible to increase the stability, or resistance to oxidation, of the polymer by the addition of stabilizers, such as antioxidants. Such stabilizers include various phenolic or amine antioxidants such as 2,6-di-tert-butyl-4methylphenol (BHT), diphenylamine (DPA), or N,N'-diphenyl-p-phenylenediamine (DPPD). This improvement obtained in accordance with the present invention is obtained whether or not antioxidants are used, and if antioxidants are used, is in addition to the improvement obtained therefrom.

A particularly important improvement provided by the present invention is the retention of the mechanical properties of the polymer for a longer period of time upon thermal aging of the polymer than would otherwise be the case. In the examples below, retention of tensile elongation as a function of thermal aging in air at 70° C. is exemplified. In each of these examples of the present invention, tensile elongation of at least 50% is maintained for at least 3 days aging at 70° C. In comparative examples 21 and 22, which compare with examples 15 and 16, tensile elongation has dropped to less than 20% by 3 days. In comparative example 23, high tensile elongation is retained for 40 days, due to the beneficial effect of the high level of antioxidant present in this sample. After 50 days aging, the elongation of this sample had dropped to 18%. The corresponding example under the present invention (example 17) retained 80% tensile elongation for at least 60 days demonstrating the beneficial effects of the invention even in samples which contain high levels of stabilizers or antioxidants.

Example 14

Samples of A and B components were prepared for molding on a laboratory scale RIM machine as follows. To prepare an activator/monomer solution, or A component, Paraloid EXL 3607 (30 g) in a 1 L pop bottle that had been previously inerted with nitrogen was suspended by mechanical stirring in a mixture of 588 mL of dicyclopentadiene, 12 mL of ethylidene norbornene, 3.66 ML of tri-n-butyltin hydride and 2.41 mL of tri-n-butylphosphite. To prepare a catalyst/monomer solution, or B component, Paraloid EXL 3607 (30 g) in a 1 L pop bottle that had been previously inerted with nitrogen was suspended by mechanical stirring in a mixture of 588 mL of dicyclopentadiene, 12 mL of ethylidene norbornene. To this was added 25.1 mL of catalyst solution prepared in Example 2.

The liquids were transferred to their respective tanks on the laboratory scale RIM machine under positive nitrogen pressure through stainless steel transfer lines. The mixing of the A stream and the B stream was accomplished using a standard impingement type RIM mixhead, and thence into a steel mild 8'×8'×⅛" thick that was heated to 70° C. The ratio of the activator/monomer solution mixed with the catalyst/monomer solution was 1:1. The mixing time and mold filling were accomplished within two seconds, after which time an exotherm occurred within another 30 seconds. After two minutes, the plaque was removed from the mold.

Example 15

The procedure of example 14 was followed except that 12 grams of 2,6-di-t-butyl-4-methylphenol (BHT) was added to the catalyst/monomer solution to provide 1% of BHT in the final polymer.

Example 16

The procedure of example 14 was used except that 4.84% BHT, 2% N-N'-diphenyl-p-phenylenediamine (DPPD), and 1.12% diphenylamine (DPA) were added to the catalyst/monomer solution.

Example 17

The procedure of example 15 was used except that 3% of Paraloid EXL 3647 was used in both the activator/monomer solution and the catalyst/monomer solution.

Example 18

The procedure of example 15 was used except that 5% of Paraloid EXL 3647 was used in both the activator/monomer solution and the catalyst/monomer solution.

Example 19

The procedure of example 15 was used except that 8% of Paraloid EXL 3647 was used in both the activator/monomer solution and the catalyst/monomer solution.

In each example, plaques were aged at 70° C. in an oven in an air atmosphere for the time indicated. Tensile properties were then measured in accordance with ASTM method D-638.

TABLE FOR EXAMPLES 14–19
Tensile Elongation as a Function of Aging

| days aging | Example 14 | Example 15 | Example 16 | Example 17 | Example 18 | Example 19 |
|---|---|---|---|---|---|---|
| 0.1 | 85% | 83% | 75% | 78% | 77% | 89% |
| 0.3 | 87% | | | | | |
| 1.0 | 70% | 83% | | 70% | 72% | |
| 3.0 | 50% | 75% | | 50% | 55% | |
| 10 | 7.1% | 5.9% | | 6.6% | 5.9% | 78% |
| 30 | 6.4% | 5.0% | 80% | | | |
| 60 | | | 80% | | | |

Comparative Example 20

The procedure of Example 15 is followed except that 3.5 percent by weight of ethylene-propylene-diene rubber is dissolved in the two monomer streams and no polymeric particles are used.

Comparative Example 21

The procedure of Example 16 is followed except that 3.5 percent by weight of ethylene-propylene-diene rubber is dissolved in the two monomer streams and no polymeric particles are used.

Comparative Example 22

The procedure of Example 17 is followed except that 3.5 percent by weight of ethylene-propylene-diene rubber is dissolved in the two monomer streams and no polymeric particles are used.

TABLE FOR COMPARATIVE EXAMPLES 20–22
Tensile Elongation as a Function of Aging

| Days Aging | Comparative Example 20 | Comparative Example 21 | Comparative Example 22 |
|---|---|---|---|
| 0.1 | 85% | 90% | 90% |
| 0.3 | 85% | | |
| 1 | 17% | 90% | |
| 3 | | 16% | |
| 10 | | | 82% |
| 40 | | | 65% |
| 50 | | | 18% |

Although the invention has been described with reference to particular means, materials and embodiments, from the foregoing, one skilled in the art can easily ascertain the essential characteristics of the present invention; and various changes and modifications may be made to various usages and conditions without departing from the spirit and scope of the invention as described in the claims that follow.

What is claimed is:

1. A polymeric composition comprising:
    a) a thermoset polymer prepared by the metathesis polymerization of a monomer mixture comprising dicyclopentadiene; and
    b) other polymeric particles, dispersed throughout the thermoset polymer, that are made of a core elastomer surrounded by a shell material, said particles being bead-like spheres or oblate spheroids having a particle size of about 1 μm to about 100 μm, said core elastomer comprising one or more elastomeric polymers selected from the group consisting of polybutadiene, butadiene-styrene copolymer, polyisoprene, and polyisobutylene, said shell material comprising one or more polymers selected from the group consisting of polymethylmethacrylate, polyethylmethacrylate, polymethylacrylate, polybutylacrylate, polyethylacrylate, and methacrylate-styrene copolymer, said shell material being cross-liked and substantially insoluble in said monomer mixture, and said polymeric particles being dispersed throughout said thermoset polymer in an amount sufficient to give the composition a notched izod impact strength of greater than about 2.7 ft.-lbs./in. notch.

2. The composition of claim 1, wherein said core elastomer comprises butadiene-styrene copolymer.

3. The composition of claim 1, wherein said shell material comprises polymethylmethacrylate.

4. The composition of claim 1, wherein said polymeric particles constitute about 0.5 to 15 wt. % of the composition.

5. The composition of claim 1, wherein said polymeric particles constitute about 5 to 10 wt. % of the composition.

6. The composition of claim 1, wherein the composition has a notched izod impact strength of greater than 3.8 ft.-lbs./in. notch.

7. The composition of claim 1, wherein the composition has a notched izod impact strength greater than about 6.6 ft.-lbs./in. notch.

8. The composition of claim 1, wherein the composition has a notched izod impact strength of at least about 7.8 ft.-lbs./in. notch.

9. The composition of claim 1, wherein the polymeric particles have a particle size of less than about 5 μm.

10. The composition of claim 1, wherein the monomer mixture comprises a major amount of dicyclopentadiene and a minor amount of ethylidene norbornene.

11. The composition of claim 1, wherein the monomer mixture comprises a major amount of dicyclopentadiene and a minor amount of tricyclopentadiene.

12. The composition of claim 1, wherein the monomer mixture comprises dicyclopentadiene and tetracyclopentadiene.

13. The composition of claim 1, wherein the composition also comprises an effective amount of an antioxidant selected from the group consisting of phenolic antioxidants and amine antioxidants.

14. The composition of claim 13, wherein the antioxidant is selected from the group consisting of 2,6-di-tert-butyl-4-methylphenol, diphenylamine, and diphenyl-p-phenylenediamine.

15. The composition of claim 1, wherein said polymeric particles constitute about 5 to 10 wt. % of the composition, the particles have a particle size of less than about 5 μm, and the composition has a notched izod impact strength of greater than 3.8 ft.-lbs./in. notch.

16. The composition of claim 15, wherein said core elastomer is butadiene-styrene copolymer and said shell material is polymethylmethacrylate.

17. The composition of claim 16, wherein the monomer mixture comprises a major amount of dicyclopentadiene and a minor amount of ethylidene norbornene.

18. The composition of claim 17, wherein the composition also comprises an effective amount of an antioxidant selected from the group consisting of phenolic antioxidants and amine antioxidants.

19. The composition of claim 18, wherein the antioxidant is selected from the group consisting of 2,6-di-tert-butyl-4-methylphenol, diphenylamine, and diphenyl-p-phenylenediamine.

20. The composition of claim 19, wherein the composition has a notched izod impact strength of at least about 7.8 ft.-lbs./in. notch.

* * * * *